(12) United States Patent
Kawamura et al.

(10) Patent No.: US 8,033,103 B2
(45) Date of Patent: Oct. 11, 2011

(54) EXHAUST PURIFICATION DEVICE

(75) Inventors: Jyun Kawamura, Chita-gun (JP); Masakuni Yokoyama, Tokai (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1050 days.

(21) Appl. No.: 11/902,705

(22) Filed: Sep. 25, 2007

(65) Prior Publication Data

US 2008/0078168 A1    Apr. 3, 2008

(30) Foreign Application Priority Data

Sep. 29, 2006 (JP) .................. 2006-266790

(51) Int. Cl.
*F01N 3/00* (2006.01)
*F01N 3/10* (2006.01)

(52) U.S. Cl. ............. 60/295; 60/277; 60/285; 60/301

(58) Field of Classification Search .......... 60/277, 60/284, 285, 286, 295, 299, 301
See application file for complete search history.

(56) References Cited

U.S. PATENT DOCUMENTS

| | | | |
|---|---|---|---|
| 5,483,795 A | 1/1996 | Katoh et al. | |
| 5,735,119 A | 4/1998 | Asanuma et al. | |
| 6,244,046 B1 | 6/2001 | Yamashita | |
| 6,336,320 B1 * | 1/2002 | Tanaka et al. | 60/285 |
| 6,345,498 B2 | 2/2002 | Yonekura et al. | |
| 6,351,943 B1 * | 3/2002 | Tagami et al. | 60/285 |
| 2001/0032456 A1 * | 10/2001 | Yonekura et al. | 60/277 |
| 2001/0054284 A1 * | 12/2001 | Mashiki | 60/285 |
| 2004/0154288 A1 * | 8/2004 | Okada et al. | 60/286 |

FOREIGN PATENT DOCUMENTS

| | | |
|---|---|---|
| DE | 199 48 156 | 4/2001 |
| EP | 1 099 465 | 5/2001 |
| JP | 2000-356124 | 12/2000 |
| JP | 2005-106005 | 4/2005 |

OTHER PUBLICATIONS

Haruhara et al., machine translation of JP 2005-106005 A, Apr. 21, 2005.*
English translation of Figure 3 of JP 2005-106005 A provided by Akiko Smith, Jul. 1, 2010.*
English translation of Figure 4 of JP 2005-106005 A provided by Akiko Smith, Jul. 1, 2010.*
Japanese Office Action dated Feb. 3, 2009, issued in corresponding Japanese Application No. 2006-266790, with English translation.
German Office Action dated Nov. 30, 2009, issued in corresponding German Application No. 10 2007 000 795.9-13, with English translation.

* cited by examiner

*Primary Examiner* — Thomas Denion
*Assistant Examiner* — Audrey Klasterka
(74) *Attorney, Agent, or Firm* — Nixon & Vanderhye PC (57) ABSTRACT

An exhaust purification device has a NOx catalyst that occludes NOx contained in exhaust gas at a lean air fuel ratio and that purifies (reduces) and discharges the occluded NOx at a rich air fuel ratio. The device performs full purge for discharging substantially an entirety of the occluded NOx at once based on establishment of an execution condition of the full purge to recover exhaust purification performance of the NOx catalyst. The device has a program for performing partial purge for discharging only part of the occluded NOx before the execution of the full purge. The device consecutively and repeatedly performs the partial purge except for the period in which the full purge is performed.

18 Claims, 7 Drawing Sheets

FIG. 9B
<u>RELATED ART</u>

EXHAUST PURIFICATION DEVICE

CROSS REFERENCE TO RELATED APPLICATION

This application is based on and incorporates herein by reference Japanese Patent Application No. 2006-266790 filed on Sep. 29, 2006.

BACKGROUND OF THE INVENTION

1. Field of the Invention

The present invention relates to an exhaust purification device for an internal combustion engine.

2. Description of Related Art

Generally, in a diesel engine for a vehicle or the like, combustion (lean combustion) is performed in a state of a lean air fuel ratio (air fuel ratio corresponding to fuel ratio lower than that of stoichiometric air fuel ratio). Accordingly, a quantity of NOx (nitrogen oxides) contained in exhaust gas increases. Therefore, reduction of a NOx emission quantity is required from the viewpoint of environmental protection.

In recent years, a device using a NOx occlusion reduction catalyst, i.e., a NOx catalyst, has been gathering attention as one of exhaust purification devices for purifying the NOx contained in the exhaust gas. The NOx catalyst used for the device consists of an alkaline earth material (occlusion material) and platinum, for example. The NOx catalyst has characteristics of occluding the NOx in the exhaust gas when the atmosphere of the exhaust gas is the lean air fuel ratio and of reducing and eliminating the occluded NOx with the use of reduction components such as HC and CO contained in the exhaust gas when the air fuel ratio becomes rich (air fuel ratio corresponding to fuel ratio higher than that of stoichiometric air fuel ratio). This device uses such the characteristic of the catalyst. The device repeats the occlusion and the reduction (discharge) of the NOx with the catalyst to purify the NOx in the exhaust gas and to reduce the NOx emission quantity.

However, also in such the device, there is limitation in the occlusion capacity of the NOx catalyst. Therefore, if the catalyst is continuously used in the environment where the NOx reduction quantity (NOx discharge quantity) exceeds the NOx occlusion quantity and the NOx occlusion quantity approximates to the occlusion limit, the NOx purification capacity of the catalyst declines significantly. Therefore, conventionally, a known exhaust emission purification device periodically reduces and removes the NOx occluded by the NOx catalyst as processing (catalyst recovery processing) for recovering from the fall of the NOx purification capacity (temporary performance degradation corresponding to NOx occlusion quantity) (for example, as described in JP-A-2000-34946 or Japanese Patent Gazette No. 2692380).

Next, with reference to FIGS. 9A and 9B, an outline of the NOx catalyst recovery processing currently performed by conventional and general devices including the above-described device will be explained. As an example, an exhaust gas purification system for a vehicular diesel engine performing usual operation by the lean combustion will be explained. The lean combustion is performed in the engine as the object of the exhaust gas purification. Therefore, after the NOx occlusion with the NOx catalyst is started, the NOx occlusion quantity Qnox increases with time as shown by a solid line L5a in FIG. 9A. The NOx purifying performance (calculated as NOx purifying rate Rnox in this example) of the NOx catalyst decreases as shown by a solid line L5b in FIG. 9B as the NOx occlusion quantity Qnox increases.

The device serially performs recovery processing to discharge substantially an entirety of the NOx occluded in the NOx catalyst (entirety or large quantity close to entirety) once every time an execution condition for the processing is satisfied (for example, at each elapse of a predetermined time). Specifically, the device performs oversupply of the fuel (i.e., rich purge), for example, at timing t50 at which the execution condition is satisfied, to make the air fuel ratio in the NOx catalyst rich temporarily. Thus, the occluded NOx is reduced by the HC, the CO and the like contained in the exhaust gas and removed. The device periodically performs the rich purge to reduce and remove substantially the entirety of the occluded NOx to periodically recover the purifying performance (exhaust purification performance) of the NOx catalyst.

In such a device, by appropriately setting the execution condition (for example, by setting an appropriate execution interval), the recovery processing (rich purge) is performed before the purifying rate falls below a required value TR (required purifying rate). The purifying capacity of the NOx catalyst is recovered every time the recovery processing is performed. As a result, the NOx catalyst can be used continuously. Thus, each of the conventional devices including the above-described device provides the system (i.e., LNT system: Lean NOx Trap system) that reduces the NOx by making the air fuel ratio rich temporarily through oversupply of the fuel. The system repeatedly performs the recovery processing as shown in FIGS. 9A and 9B based on the appropriate execution condition to continuously purify the exhaust gas (NOx) to thereafter operate at a high purifying rate.

However, the exhaust gas purification performance of the NOx catalyst does not necessarily depend only on the NOx occlusion quantity. Rather, in some cases, performance degradation of the catalyst can be caused by other factors than the NOx occlusion quantity. For example, since a sulfur component is contained in the engine fuel, SOx (sulfur oxides) as oxides of sulfur are generated during combustion and is also occluded by the NOx catalyst like the NOx. Since SOx is a chemically stable substance, it is difficult to release SOx from the NOx catalyst even by making the air fuel ratio rich. Therefore, if a state of increased SOx occlusion quantity (sulfur poisoning) is reached, the NOx purifying capacity will decline by SOx occlusion quantity. In the state where sulfur poisoning has arisen, in a graph (time chart) showing the purification characteristic of the NOx catalyst at the time of applying the recovery processing shown in FIGS. 9A and 9B to the NOx catalyst, the NOx purifying rate falls as a whole, for example, as shown by broken lines L6a, L6b in FIGS. 9A and 9B respectively, compared to the graph shown by the solid lines L5a and L5b. Therefore, as shown in FIG. 9B, there is a concern that the purifying rate Rnox of the NOx catalyst becomes less than the demanded purifying rate TR, for example, at timing t51 before the timing t50 at which the recovery processing is applied to the catalyst.

That is, with the above-described conventional device, even if the execution condition is once set appropriately, the adequacy of the condition will be lost if degradation (for example, sulfur poisoning) arises in the NOx catalyst in connection with the elapse of time. Accordingly, there occurs a concern that the purifying rate (exhaust gas purification performance) of the catalyst falls below the demanded purifying rate.

SUMMARY OF THE INVENTION

It is an object of the present invention to provide an exhaust purification device capable of more surely maintaining a purifying rate equal to or higher than a demanded purifying rate, for example, even when degradation such as sulfur poisoning arises in an occlusion purification part using a NOx catalyst or the like.

According to an aspect of the present invention, an exhaust purification device has an occlusion purification part that occludes a specific component contained in exhaust gas under an occlusion condition and that purifies and discharges the occluded exhaust component under a purification condition, a full recovery device that performs main recovery processing for discharging substantially an entire portion of the exhaust component occluded in the occlusion purification part based on establishment of an execution condition of the main recovery condition to recover an exhaust purification performance of the occlusion purification part, and a partial recovery device that performs partial recovery processing for discharging part of the exhaust component occluded in the occlusion purification part before the execution of the main recovery processing.

Figure 9A:
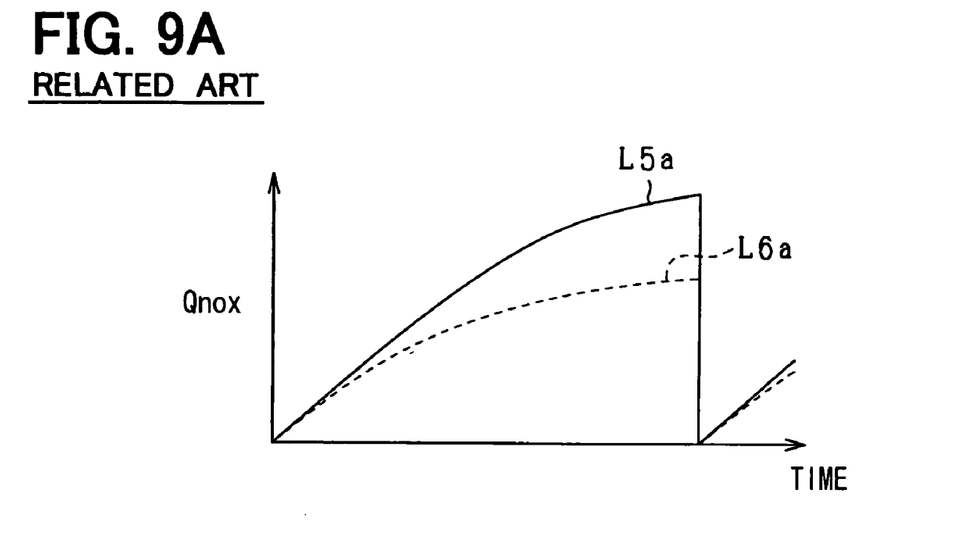
FIG. 9A is a time chart showing a transition of a NOx occlusion quantity during catalyst recovery processing performed by an exhaust purification device of a related art.
Figure 9B:
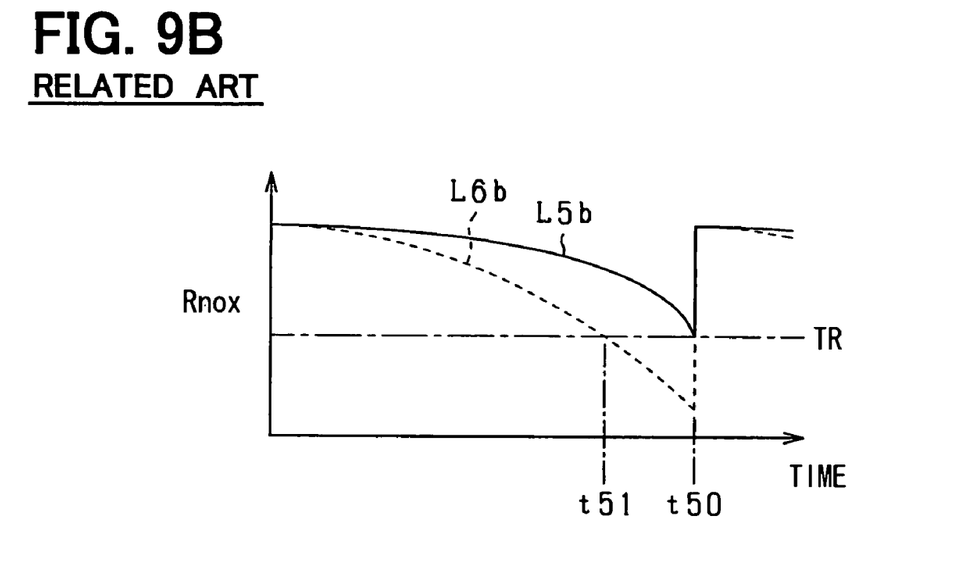
FIG. 9B is a time chart showing a transition of a NOx purifying rate during the catalyst recovery processing performed by the exhaust purification device of the related art.

As mentioned above, in the conventional device, while the occlusion is performed in the occlusion purification part (for example, NOx catalyst), the purifying rate of the occlusion purification part continues to decrease (as shown in FIGS. 9A and 9B). In contrast, the device according to the present invention has the partial recovery device. Accordingly, partial recovery processing for discharging only a part of the exhaust component occluded in the occlusion purification part can be performed before the main recovery processing for discharging substantially the entire portion (entire portion or large portion close to entire portion) of the occluded component performed at the timing t50 shown in FIG. 9B. Specifically, the partial recovery processing controls the discharge quantity of the occlusion component in the occlusion purification part, for example, based on conditions such as an execution time of the partial recovery processing and the discharge quantity per unit time discharged by the processing. Thus, the discharge is stopped when the discharge quantity is smaller than in the case of the main recovery processing, which does not need special control about the discharge quantity. Therefore, the occluded exhaust component occluded in the occlusion purification part can be reduced at every execution of the partial recovery processing, and the exhaust purification performance of the occlusion purification part can be partly recovered. That is, through partial recovery processing, the purifying rate can be maintained at a high value by inhibiting the descent of the purifying rate (i.e., gradually changing purifying rate). Thus, the device can maintain the purifying rate equal to or higher than the demanded purifying rate more certainly even when degradation such as sulfur poisoning arises in the occlusion purification part constituting the NOx catalyst or the like.

A method of setting the execution interval (period before timing t50 of FIG. 9B) of the main recovery processing short by assuming the purifying rate as of the degradation from the beginning can be used as the method of maintaining the high purifying rate. However, for example, if the above-mentioned rich purge is frequently performed in a vehicular engine in order to perform such the main recovery processing, fuel consumption (fuel consumption rate) will deteriorate. Also about this point, since there is no necessity of increasing the number of times of the main recovery processing in the above-described scheme of the present invention. As a result, useless fuel consumption can be inhibited and the preferable fuel consumption can be maintained.

The main recovery processing and the partial recovery processing should be preferably executed with the common device in order to simplify the structure.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
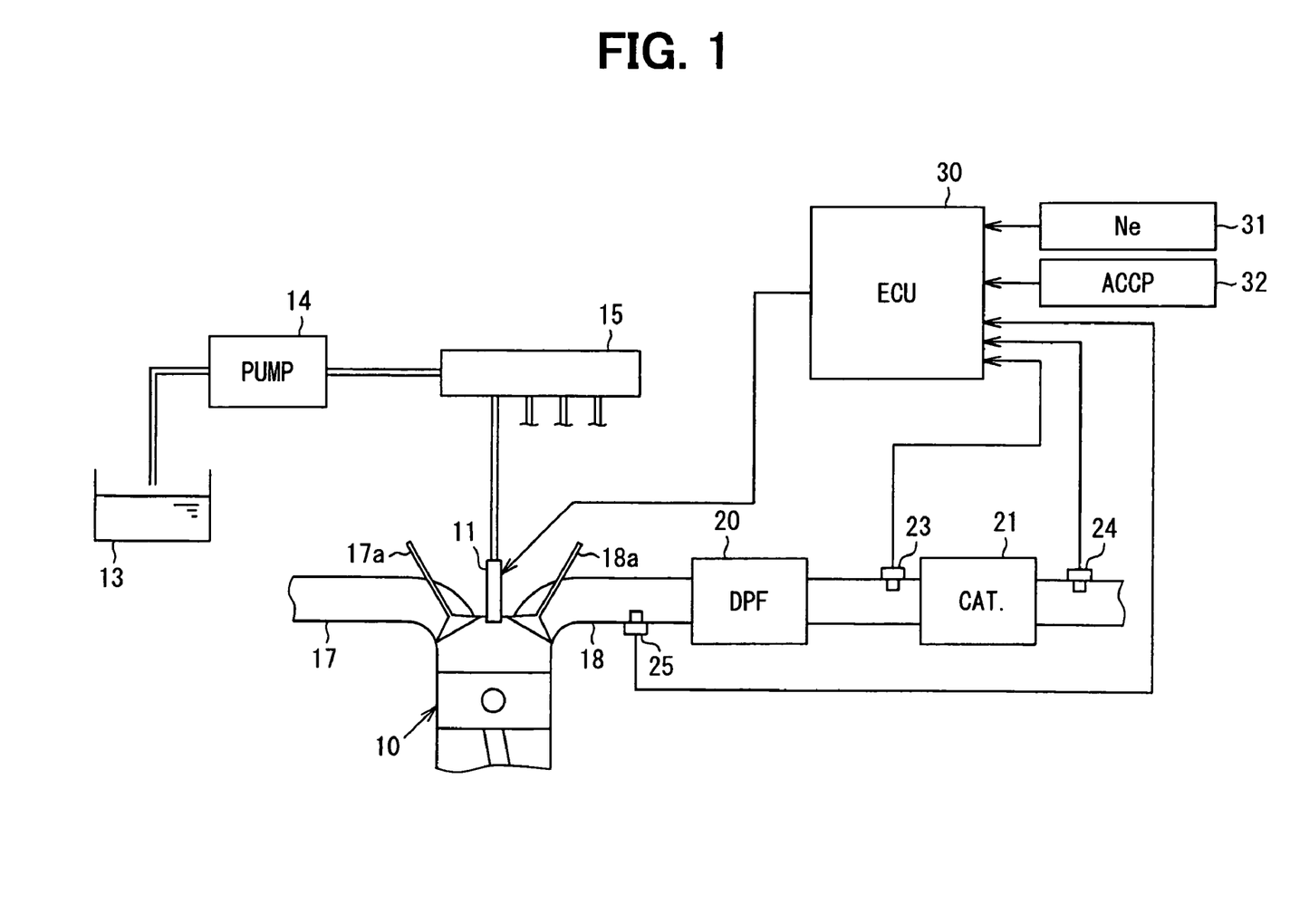
FIG. 1 is a schematic diagram showing an engine control system including an exhaust purification device according to an embodiment of the present invention.

Referring to FIG. 1, a vehicular engine control system having an exhaust purification device according to an embodiment of the present invention is illustrated. The exhaust purification device according to the embodiment provides a system (i.e., LNT system: Lean NOx Trap system) that reduces NOx by making an air fuel ratio rich temporarily through oversupply of fuel (rich purge) in the engine control system like the device described in JP-A-2000-34946 or Japanese Patent Gazette No. 2692380. In the present embodiment, the exhaust purification device is applied to a car (diesel car), which has a diesel engine (internal combustion engine) as a source of power. A multi-cylinder reciprocating engine is assumed as an engine in the present embodiment. Only one cylinder is illustrated in FIG. 1 for the convenience of explanation.

As shown in FIG. 1, the system has the internal combustion engine 10 as a diesel engine. The system also has various sensors, an ECU 30 (electronic control unit) and the like for controlling the engine 10. The engine 10 has injectors 11 of an electromagnetic drive type (or piezo drive type, for example) in the cylinders respectively. Fuel injection from the injectors 11 into combustion chambers of the respective cylinders is performed in accordance with a predetermined combustion order.

A fuel supply system according to the present embodiment adopts a common rail fuel supply system. A high-pressure pump 14 pressurizes the fuel (light oil) drawn from a fuel tank 13 and pumps the fuel to a common rail 15 as a pressure accumulation pipe. The fuel in the common rail 15 is maintained at a high pressure state by the fuel pumping from the pump 14. The high-pressure fuel in the common rail 15 is supplied to the injectors 11 and the high-pressure fuel is injected and supplied into the respective cylinders in accordance with valve opening operations of the injectors 11. An intake pipe 17 and an exhaust pipe 18 are connected to the engine 10. If an intake valve 17a opens, an air is introduced (suctioned) into the cylinder through the intake pipe 17. If an exhaust valve 18a opens, exhaust gas produced through combustion of the fuel is discharged through the exhaust pipe 18.

A DPF (diesel particulate filter) 20 for collecting particulate matters contained in the exhaust gas and a catalyst 21 (NOx catalyst) of a NOx occlusion reduction type for purifying NOx contained in the exhaust gas are provided as an exhaust after treatment system for performing exhaust purification in the exhaust pipe 18 constituting an exhaust system of the engine 10. In the present embodiment, the DPF 20 is provided in an upstream portion of the exhaust pipe 18 and the NOx catalyst 21 is provided in a downstream portion of the exhaust pipe 18 respectively.

The NOx catalyst 21 is a NOx catalyst of a kind used generally and widely consisting of, for example, an alkaline earth material (occlusion material) and platinum. The NOx catalyst 21 has characteristics of occluding the NOx in the exhaust gas when the atmosphere of the exhaust gas is a lean air fuel ratio (air fuel ration corresponding to fuel ratio lower than that of stoichiometric air fuel ratio) and of reducing and eliminating the occluded NOx with the use of reduction components such as HC and CO contained in the exhaust gas when the air fuel ratio becomes rich (air fuel ratio corresponding to fuel ratio higher than that of stoichiometric air fuel ratio).

A/F sensors 23, 24 are provided upstream and downstream of the NOx catalyst 21 respectively. The A/F sensors 23, 24 are oxygen concentration sensors that output oxygen concentration sensing signals corresponding to current oxygen concentrations in the exhaust gas. The air fuel ratio is serially calculated based on the oxygen concentration sensing signals. Generally, adjustment is made such that the oxygen concentration sensing signal as the sensor output of each of the A/F sensors 23, 24 changes linearly in accordance with the oxygen concentration. An exhaust temperature sensor 25 for sensing exhaust temperature is provided in the exhaust pipe 18 upstream (or downstream) of the DPF 20.

The ECU 30 is the main part that performs engine control as an electronic control unit in the system. In addition to the sensor outputs (sensing signals) of the A/F sensors 23, 24 and the exhaust temperature sensor 25, sensing signals of various sensors such as a rotation speed sensor 31 for sensing engine rotation speed Ne and an accelerator sensor 32 for sensing an accelerator operation amount (accelerator position ACCP) provided by an operator (driver) are serially inputted to the ECU 30. The ECU 30 operates the various actuators such as the injectors 11 in desired modes based on the sensing signals of the various sensors for sensing the operation state of the engine 10 and the demand of the user to perform various kinds of control of the engine 10 (for example, fuel injection control concerning injection quantity and injection pressure of fuel used in combustion).

In more detail, the ECU 30 includes a microcomputer of a known structure (not shown). Fundamentally, the microcomputer consists of various kinds of computing units, storage devices, communication devices and the like such as a CPU (basic processing unit) for performing various kinds of computation, a RAM (random access memory) as a main memory for temporarily storing data in the progress of the computation, a result of the computation and the like, a ROM (read only memory) as a program memory, an EEPROM (electrically rewritable nonvolatile storage) as a memory for data storage, and input/output ports for inputting/outputting the signals from/to an exterior. Various kinds of programs, control maps and the like concerning the engine control including the program concerning the exhaust purification control are beforehand stored in the ROM. Various kinds of control data including design data of the engine 10 are beforehand stored in the memory for data storage (EEPROM).

The system according to the present embodiment uses the characteristic of the NOx catalyst 21, and repeats the occlusion and the reduction (discharge) of the NOx with the NOx catalyst 21 like the device of JP-A-2000-34946 or Japanese Patent Gazette No. 2692380 (FIGS. 9A and 9B). Thus, the system purifies the NOx contained in the exhaust gas to reduce the NOx emission quantity. Like the device described in JP-A-2000-34946 or Japanese Patent Gazette No. 2692380, the purification performance of the NOx catalyst 21 is lowered by the increase of the NOx quantity (NOx occlusion quantity) in the NOx catalyst 21. Therefore, the system also serially reduces and removes the NOx occluded by the NOx catalyst 21 as the processing (catalyst recovery processing) for recovering from the fall of the NOx purifying capacity (temporary performance degradation according to NOx occlusion quantity) at a predetermined execution interval.

Figure 2A:
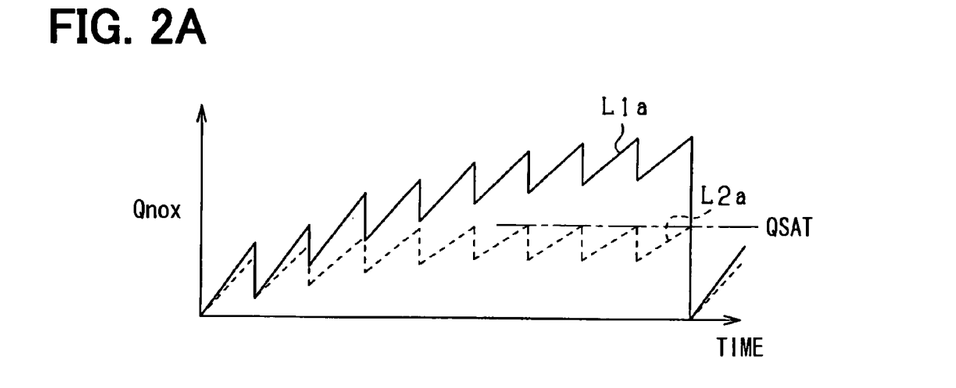
FIG. 2A is a time chart showing a transition of a NOx occlusion quantity during catalyst recovery processing according to the embodiment.
Figure 2B:
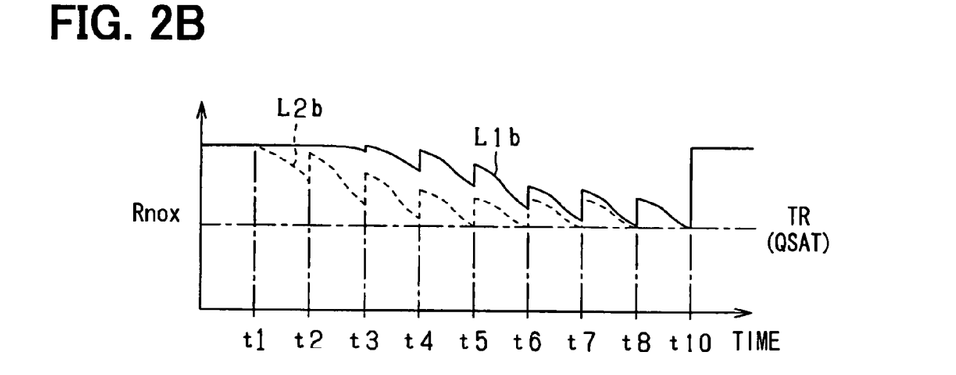
FIG. 2B is a time chart showing a transition of a NOx purifying rate during the catalyst recovery processing according to the embodiment.
Figure 3:
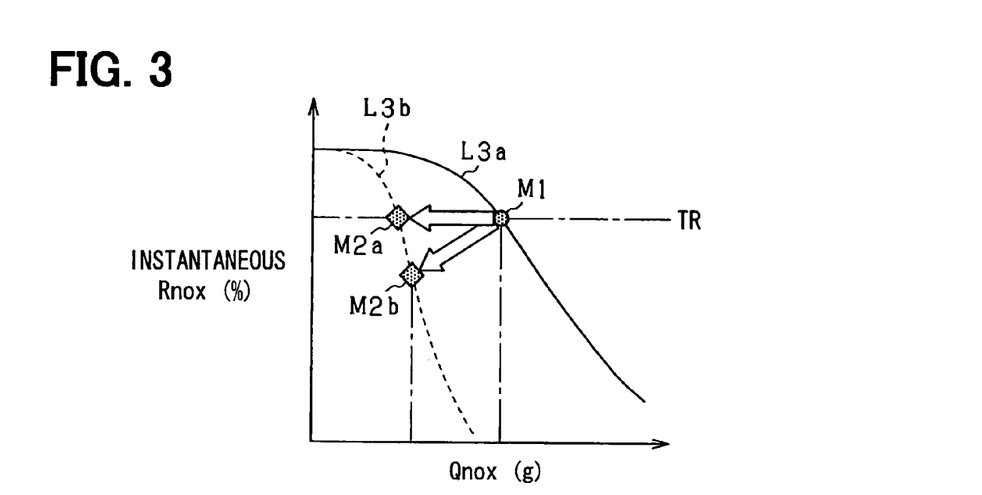
FIG. 3 is a graph showing a relationship between the NOx occlusion quantity and an instant NOx purifying rate of a NOx catalyst according to the embodiment.

However, differently from the conventional device, as shown in FIGS. 2A, 2B and 3, the device according to the present embodiment performs partial recovery processing for discharging part of the exhaust components (NOx) occluded in the NOx catalyst 21 (as shown in FIGS. 2A and 2B) before the recovery processing performed at the timing t50 of FIG. 9B, i.e., before the main recovery processing for discharging substantially an entire portion (entire portion or large portion close to entire portion) of the occluded NOx (occluded components). Thus, the system maintains the purifying rate equal to or higher than the demanded purifying rate TR more certainly also when degradation such as the sulfur poisoning (adsorption of sulfur oxides) arises in the NOx catalyst 21 (at point M2a in FIG. 3).

Next, the catalyst recovery processing according to the present embodiment including the partial recovery processing will be explained in detail with reference to FIGS. 2A, 2B, 3 and 4 to 8. The explanation will be given by using a general operation mode of the diesel engine, i.e., the case where the stationary operation of the engine 10 is performed by the lean combustion, as an example.

First, a difference between the catalyst recovery processing shown in FIGS. 9A and 9B and the catalyst recovery processing according to the present embodiment will be explained with reference to FIGS. 2A to 3. FIGS. 2A and 2B are time charts corresponding to FIGS. 9A and 9B respectively. FIGS. 2A and 2B are time charts showing transitions of the NOx occlusion quantity Qnox and the NOx purifying performance (NOx purifying rate Rnox) in the case where the catalyst recovery processing according to the embodiment is performed. FIG. 3 is a graph showing a relationship between the NOx occlusion quantity Qnox and the instantaneous NOx purifying rate Rnox of the NOx catalyst 21. In FIGS. 2A to 3, solid lines L1a, L1b, L3a show the characteristics of the NOx catalyst 21 before degradation (sulfur poisoning). Broken lines L2a, L2b, L3b show the characteristics of the NOx catalyst 21 after the degradation (sulfur poisoning).

As shown in FIGS. 2A to 3, the device performs the main recovery processing for discharging substantially the entire portion (entire portion or large quantity close to entire portion) of the occluded NOx at once every time the execution condition of the processing is satisfied. Specifically, the device performs oversupply (i.e., rich purge) of the fuel (light oil) to the NOx catalyst 21, for example, at timing t10 at which the execution condition is satisfied, to make the air fuel ratio in the NOx catalyst 21 rich temporarily by adjusting (suitably controlling) the fuel injection quantity of the injector 11, an opening degree of an intake air throttle valve (throttle valve) (not shown) or the like. The device supplies a reduction component (reducing agent) such as the HC and the CO enough to discharge the substantially entire portion of the occluded NOx at once to the NOx catalyst 21. Thus, the substantially entire portion of the NOx occluded in the catalyst 21 is reduced to nitrogen (N2), carbon dioxide (CO2) and water (H2O) and is removed. The NOx purifying capacity of NOx catalyst 21 is recovered by the reduction and removal of the NOx.

The device according to the present embodiment also performs the partial recovery processing for discharging only part of the occluded NOx before the main recovery processing. Specifically, the device performs the oversupply of the fuel (i.e., rich purge), for example, at timings t1 to t8 at which the execution condition of the partial recovery processing is satisfied, to make the air fuel ratio in the NOx catalyst 21 rich temporarily as shown in FIGS. 2A and 2B as in the case of the main recovery processing. The device supplies the reduction component (HC, CO and the like) enough to discharge only the part of the occluded NOx to the NOx catalyst 21. In the partial recovery processing, the discharge quantity of the occluded NOx is controlled, for example, based on an execution period of the processing, and the NOx discharge from the catalyst 21 is stopped in the middle. Thus, the NOx occlusion quantity partially decreases every time the partial recovery processing is executed. As a result, lowering of the purifying rate corresponding to the NOx occlusion quantity is inhibited, and the NOx purifying rate is maintained at a higher value.

For example, the decline in the purifying rate in the case where the NOx catalyst 21 deteriorates is inhibited in the mode shown in FIG. 3. That is, with the device shown in FIGS. 9A and 9B, the purifying rate Rnox falls from a rate shown by a point M1 to a rate shown by a point M2b in FIG. 3. In contrast, with the device according to the present embodiment, the fall is limited to the fall from the rate shown by the point M1 to a rate shown by the point M2a in FIG. 3. Furthermore, the device according to the present embodiment repeatedly performs the partial recovery processing before the execution of the main recovery processing and appropriately controls the parameter (execution period) concerning the partial recovery processing. Thus, the device saturates the increase in the NOx occlusion quantity and as a result the lowering of the purifying rate of the NOx catalyst 21 to prevent the purifying rate of the NOx catalyst 21 from falling below the saturation value (demanded purifying rate TR).

In detail, as shown by broken lines L2a, L2b in FIGS. 2A and 2B, specifically when the NOx catalyst 21 degrades, the NOx occlusion quantity Qnox per unit time between the partial recovery processings (equivalent to inclination of graph shown in FIG. 2A) decreases with time. Finally, the discharge quantity and the occlusion quantity of the NOx are balanced. Thus, the NOx occlusion quantity Qnox is saturated to a constant value (constant cycle). FIG. 2B shows a case in which the parameters regarding the partial recovery processing are controlled so that the saturation value QSAT and the demanded purifying rate TR of the NOx purifying rate Rnox exactly coincide with each other.

Though a case of performing the partial recovery processing only eight times before the main recovery processing is illustrated for the sake of convenience of explanation, practically, it is assumed that the partial recovery processing is performed approximately twenty times (execution interval ranges from one minute to several minutes, for example). It is assumed the execution interval of the main recovery processing is approximately twenty minutes, for example. In the present embodiment, both of the main recovery processing and the partial recovery processing are performed by the oversupply (rich purge) of the fuel. Hereinafter, the main recovery processing is called full purge, and the partial recovery processing is called partial purge.

Figure 4:
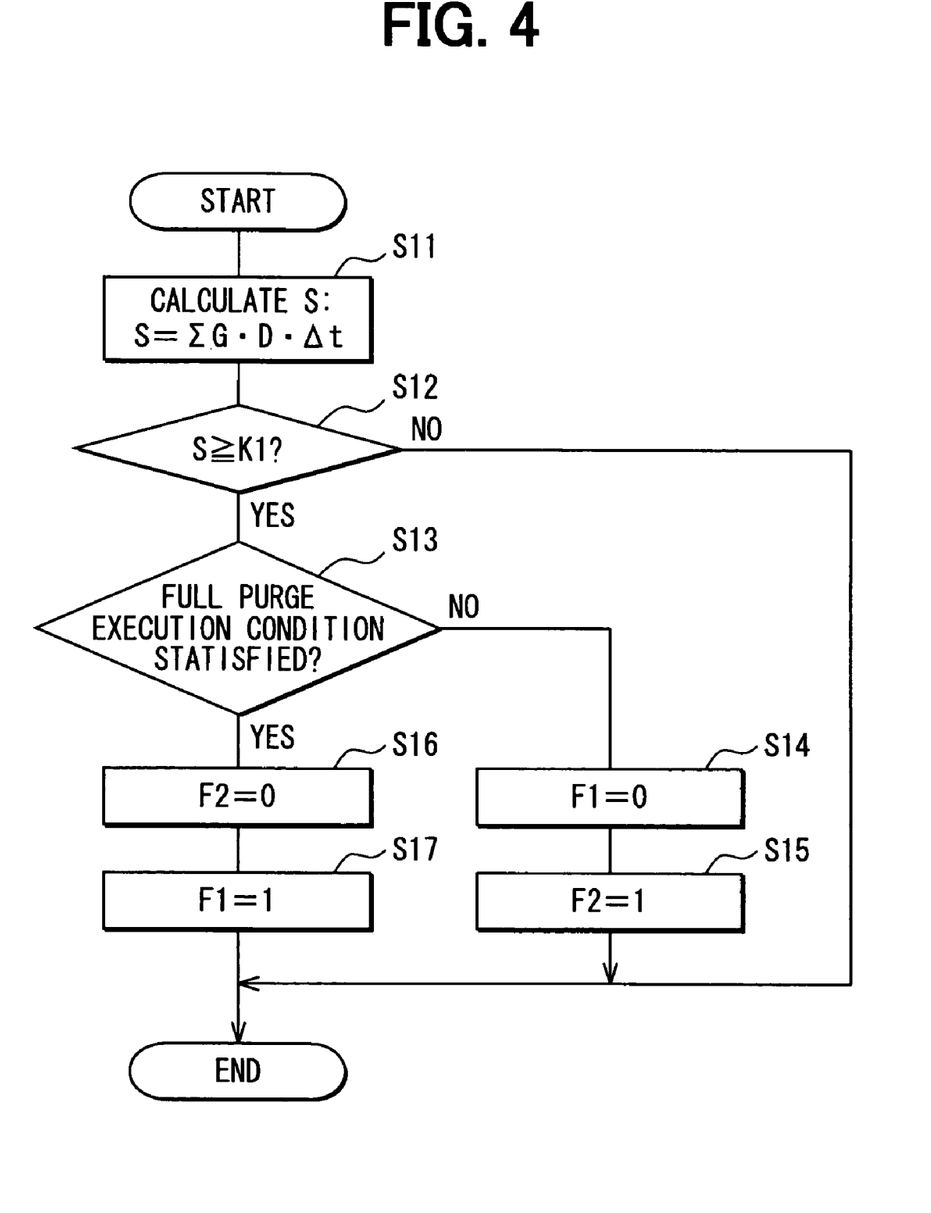
FIG. 4 is a flowchart showing a procedure of the catalyst recovery processing according to the embodiment.
Figure 5:
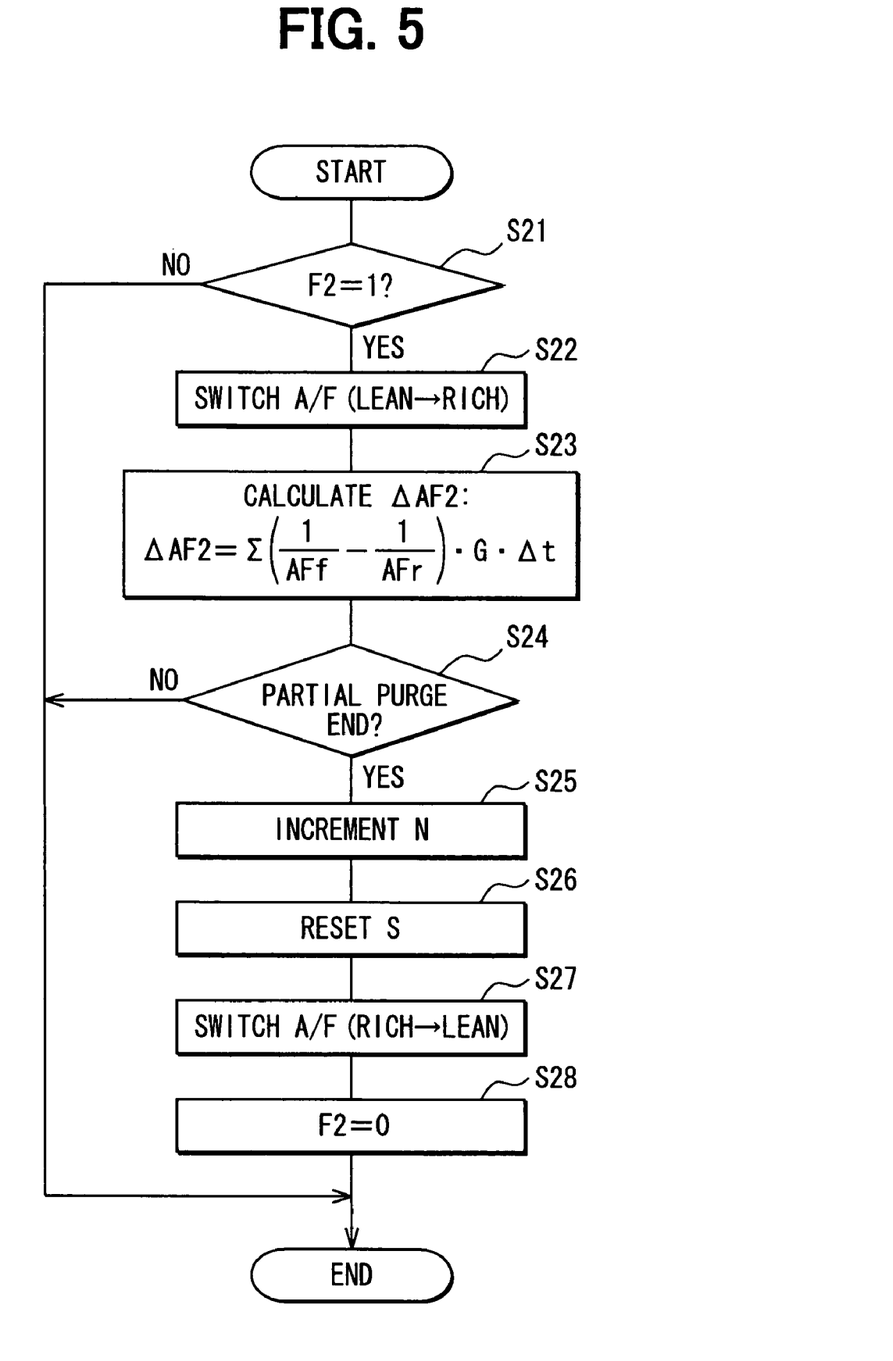
FIG. 5 is a flowchart showing a procedure of the catalyst recovery processing according to the embodiment.
Figure 6:
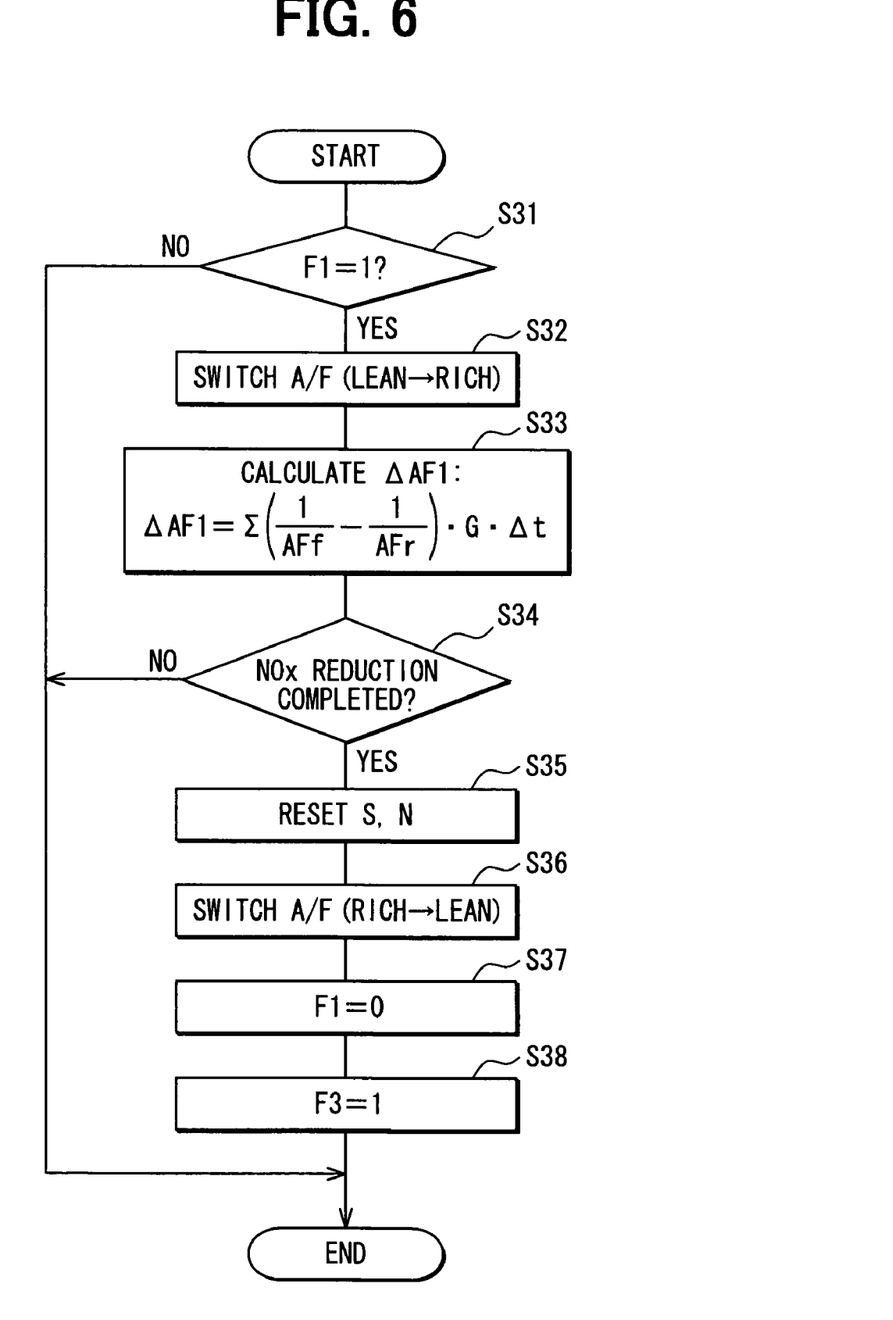
FIG. 6 is a flowchart showing a procedure of the catalyst recovery processing according to the embodiment.
Figure 7:
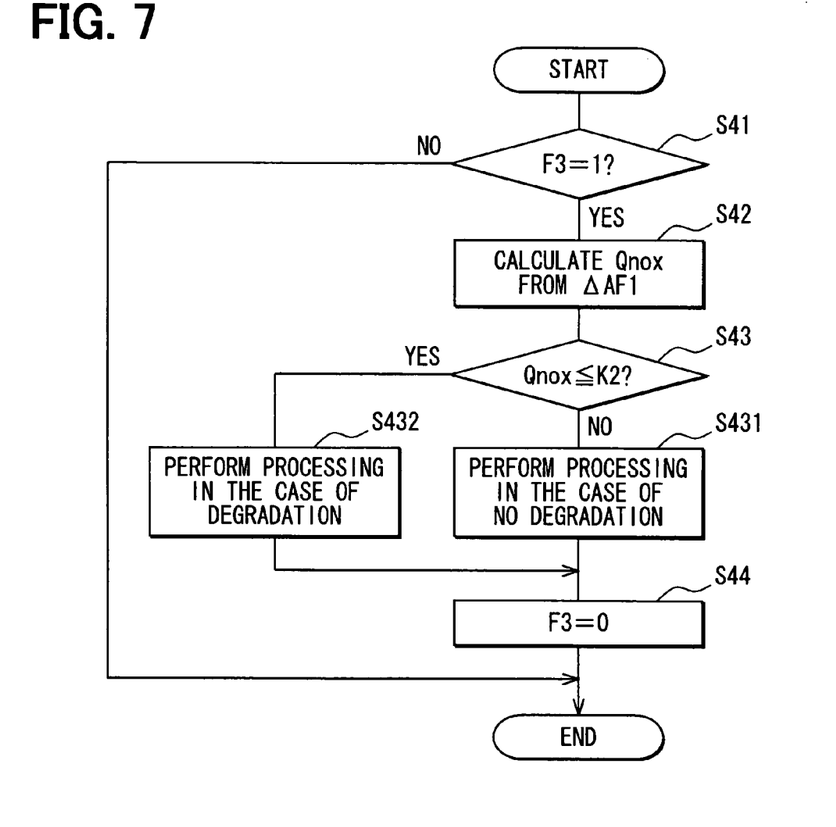
FIG. 7 is a flowchart showing a procedure of the catalyst recovery processing according to the embodiment.

FIGS. 4 to 7 are flowcharts showing a procedure of the catalyst recovery processing performed by the device (ECU 30) according to the present embodiment. The values of the various parameters used in the processing shown in FIGS. 4 to 7 are stored at any time in the storage devices mounted in the ECU 30 such as the RAM and the EEPROM and updated at any time if needed. Fundamentally, a series of processing shown in FIGS. 4 to 7 is serially performed in a predetermined cycle of crank angle or time through execution of the programs stored in the ROM performed by the ECU 30. A first step of the processing shown in each one of FIGS. 5 to 7 determines whether the execution condition is formed. That is, if a flag F2 is set at 1, the execution condition of the processing of FIG. 5 is satisfied. Likewise, if a flag F1 or a flag F3 is set at 1, the execution condition of the processing of FIG. 6 or 7 is satisfied. The determination of the execution condition is repeatedly performed until the execution condition is satisfied, and the processing proceeds to a next step if the execution condition is satisfied. In the present embodiment, the initial value of each one of the flags F1-F3 is set at 0. Therefore, only the processing of FIG. 4 progresses in the beginning.

Next, the processing of FIG. 4 will be explained. As shown in FIG. 4, in a series of the processing, first, Step S11 calculates (counts up) an introduction NOx quantity S by integrating (with unit time $\Delta t$) an introduction NOx quantity (product of exhaust flow rate G and introduction NOx concentration D) introduced into the NOx catalyst 21 through the exhaust pipe 18 per unit time. For example, the introduction NOx quantity S is calculated by a formula: $S=\Sigma G \cdot D \cdot \Delta t$. The introduction NOx concentration D can be estimated, for example, based on the engine operation state (operation mode) of each time and the like. That is, combustion temperature can be calculated based on the engine rotation speed Ne and a load (accelerator operation amount ACCP) and the introduction NOx concentration D can be estimated based on the combustion temperature. The introduction NOx concentration D can be also calculated by providing a NOx sensor in the exhaust pipe 18 and by sensing the NOx concentration in the exhaust gas directly. The exhaust gas flow rate G can be sensed by providing an airflow meter or the like in the intake system, for example. The exhaust gas flow rate G can be calculated based on the engine operation area. In the present embodiment, the exhaust gas flow rate G is sensed with the airflow meter (not shown).

Then, Step S12 determines whether the introduction NOx quantity S calculated at Step S11 is "equal to or greater than" a predetermined threshold value K1 (equivalent to parameter for determining execution interval of partial purge). If it is determined that the introduction NOx quantity S is less than the threshold value K1 (S<K1), it is determined that the execution of the rich purge is unnecessary this time and the series of the processing is ended as it is.

If it is determined that the introduction NOx quantity S is "equal to or greater than" the threshold value K1 (S≧K1), the processing proceeds to Step S13 to determine whether the execution condition of the full purge is satisfied. In the present embodiment, the full purge execution condition is satisfied if the time number N of the execution of the partial purge becomes equal to or greater than a predetermine number (8, for example) since the previous execution of the full purge in the case where the full purge has been already performed or since the execution of the first partial purge (or since certain execution partial purge, e.g., second partial purge) in the case where the full purge has not been performed yet. For example, in the early stage where the partial purge has not been performed, it is determined that the full purge execution condition is not satisfied at Step S13.

If it is determined that the full purge execution condition is not satisfied at Step S13, the full purge execution flag F1 is reset to 0 at following Step S14, and the partial purge execution flag F2 is set at 1 at following Step S15. The full purge execution flag F1 and the partial purge execution flag F2 are related to the execution conditions of the processing of FIG. 6 and FIG. 5 respectively as mentioned above. That is, the execution condition of processing of FIG. 5 is satisfied by the processing of Step S15.

Next, the processing of FIG. 5 will be explained. As shown in FIG. 5, first in the processing, Step S21 determines whether the execution condition is satisfied. If the condition is satisfied, the processing proceeds to Step S22. Step S22 switches the air fuel ratio from the lean state to the rich state (if air fuel ratio has been rich, air fuel ratio is maintained rich). In the present embodiment, the oversupply (rich purge) of the fuel to the NOx catalyst 21 is performed at the air fuel ratio of approximately 12.0, for example. This rich purge corresponds to the above-mentioned partial purge (FIGS. 2A and 2B). The execution of the rich purge can be determined based on the sensing signal of the A/F sensor 23 provided upstream of the NOx catalyst 21 (i.e., air fuel ratio is rich during rich purge execution). However, if the reduction and the removal of the occluded NOx are in progress, the supplied reduction component (reducing agent) is consumed by the reduction and the removal even during the rich purge execution. Therefore, unlike the sensing signal of the A/F sensor 23, the A/F sensor 24 provided downstream of the NOx catalyst 21 provides the sensing signal exhibiting the lean air fuel ratio or the stoichiometric air fuel ratio.

Thus, in the state where the rich purge is performed, following Step S23 calculates the quantity of the reducing agent consumed by the rich purge control (reducing agent consumption quantity $\Delta AF2$) by integrating the reducing agent quantity consumed per unit time $\Delta t$ (through temporal integration). The reducing agent consumption quantity $\Delta AF2$ is reset every time the flag F2 is changed from 0 to 1. The reducing agent consumption quantity $\Delta AF2$ is calculated and updated based on the sensor outputs AFf, AFr (sensing signals) of the A/F sensors 23, 24 provided upstream and downstream of the NOx catalyst 21 and the exhaust gas flow rate G. For example, the reducing agent consumption quantity $\Delta AF2$ is calculated and updated by a formula: $\Delta AF2 = \Sigma[(1/AFf) - (1/AFr)] \cdot G \cdot \Delta t$, while reading the initial value or the previous value.

Following Step S24 determines whether a predetermined end condition concerning the partial purge is satisfied. For example, it is determined whether the reducing agent consumption quantity $\Delta AF2$ calculated at Step S23 is greater than a quantity (value converted based on map or the like) corresponding to a predetermined ratio (e.g., 70%) of the introduction NOx quantity S calculated at Step S11 of FIG. 4 (i.e., $\Delta AF2 >$ converted value $(S \times 0.7)$). The predetermined ratio of the introduction NOx quantity S should be preferably set at a suitable value in accordance with the demanded purifying rate TR. In the present embodiment, the predetermined ratio is the fixed value. Alternatively, the ratio may be set variably in accordance with the degradation degree of the NOx catalyst 21 or the like. The rich purge is continuously applied to the NOx catalyst 21 and the reducing agent consumption quantity $\Delta AF2$ is integrated and updated continuously at Step S23 until Step S24 determines that the predetermined ending condition concerning the partial purge is satisfied (i.e., reducing agent consumption quantity $\Delta AF2$ exceeds converted value based on introduction NOx quantity S).

If it is determined that the predetermined ending condition concerning the partial purge is satisfied at Step S24, following Step S25 counts up the execution time number N of the partial purge (N=N+1). Then, following Step S26 resets the introduction NOx quantity S to 0.

Following Step S27 switches the air fuel ratio from the rich state to the lean state (air fuel ratio as of steady operation) again. Thus, the partial purge is ended. Thus, in the present embodiment, the oversupply (rich purge) of the fuel to the NOx catalyst 21 is performed, for example, at the air fuel ratio of approximately 12.0. In order to control the discharge quantity of the occluded NOx from the catalyst 21 based on the execution period of the rich purge, the discharge is stopped in the middle and the air fuel ratio is switched from the rich state to the lean state. Then, following Step S28 resets the partial purge execution flag F2 to 0. Thus, the execution condition of the processing of FIG. 5 is not satisfied and the series of the processing of the partial purges is ended.

As shown in FIG. 4, in the series of the processing, the partial purge execution flag F2 is set to 1 at Step S15 and the processing of FIG. 5 is performed every time the introduction NOx quantity S becomes equal to or greater than the threshold value K1 (determined at Step S12) until it is determined that the full purge execution condition is satisfied at Step S13, i.e., until the condition $N \geq 8$ is satisfied. Thus, in the present embodiment, the oversupply (rich purge) of the fuel to the NOx catalyst 21 is performed at the timings t1 to t8 in the time chart shown in FIG. 2B.

If it is determined that the full purge execution condition is satisfied at Step S13, the partial purge execution flag F2 is reset to 0 at following Step S16, and the full purge execution flag F1 is set at 1 at following Step S17. Thus, the execution condition of the processing of FIG. 6 is satisfied.

In a series of processing shown in FIG. 6, first, Step S31 determines whether the execution condition is satisfied. If the condition is satisfied, the processing proceeds to Step S32. Step S32 switches the air fuel ratio from the lean state to the rich state (if air fuel ratio has been rich, air fuel ratio is maintained rich). In the present embodiment, the oversupply (rich purge) of the fuel to the NOx catalyst 21 is performed at the air fuel ratio of approximately 12.0, for example. Thus, in the present embodiment, the oversupply (rich purge) of the fuel to the NOx catalyst 21 is performed at the timing t0 of the time chart shown in FIG. 2B. This rich purge corresponds to the above-mentioned full purge. The execution of the rich purge can be determined based on the sensing signal of the A/F sensor 23 provided upstream of the NOx catalyst 21 (i.e., air fuel ratio is rich during rich purge execution).

Thus, in the state where the rich purge is performed, following Step S33 calculates the quantity of the reducing agent consumed by the rich purge control (reducing agent consumption quantity $\Delta AF1$) by integrating the reducing agent quantity consumed per unit time $\Delta t$ (through temporal integration). This processing is similar to the processing at Step S23 of FIG. 5.

Following Step S34 determines whether substantially an entire portion of the NOx occluded in the NOx catalyst 21 is reduced and removed through the rich purge. Specifically, it is determined whether the reduction removal of the occluded NOx is completed based on the sensing signal of the downstream A/F sensor 24. That is, if the rich air fuel ratio is sensed by the A/F sensor 24, it is determined that the reduction removal of the occluded NOx is completed. As mentioned above, the lean air fuel ratio or the stoichiometric air fuel ratio is sensed by the A/F sensor 24 until the reduction removal is completed. The rich purge is continuously applied to the NOx catalyst 21 and the reducing agent consumption quantity ΔAF1 is continuously integrated at Step S33 until Step S34, determines that the substantially entire portion of the occluded NOx is reduced and removed (i.e., reduction removal of occluded NOx is completed).

If it is determined that the substantially entire portion of the occluded NOx is reduced and removed at Step S34, following Step S35 resets the introduction NOx quantity S and the partial purge execution time number N to 0 respectively. Thus, it is determined that the full purge execution condition is not satisfied at Step S13 of FIG. 4, so the partial purge is executed again.

Following Step S36 switches the air fuel ratio from the rich state to the lean state (air fuel ratio as of steady operation) again. Thus, the full purge is completed. Then, the full purge execution flag F1 is also reset to 0 at following Step S37, and the degradation determination execution flag F3 is set at 1 at following Step S38. Thus, the execution condition of the processing of FIG. 7 is satisfied and the execution condition of the processing of FIG. 6 is not satisfied.

Figure 8:
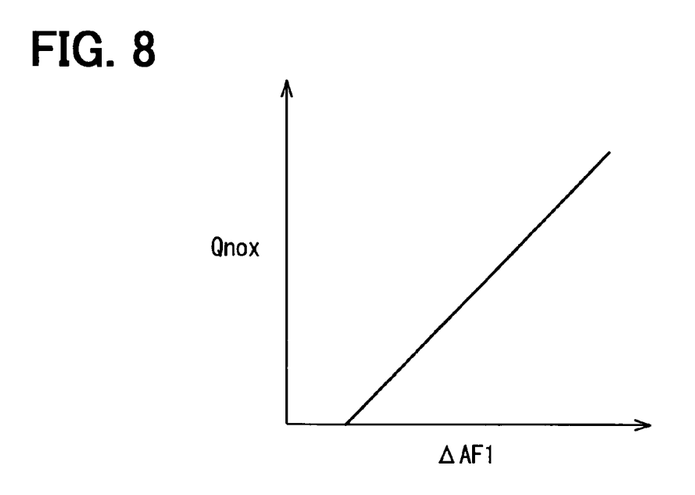
FIG. 8 is a graph showing a map used for the catalyst recovery processing according to the embodiment.

Next, the processing of FIG. 7 will be explained. In a series of processing shown in FIG. 7, first, Step S41 determines whether the execution condition is satisfied. If the condition is satisfied, the processing proceeds to Step S42. Step S42 calculates the NOx occlusion quantity (equivalent to deterioration degree of NOx catalyst 21) based on the reducing agent consumption quantity ΔAF1 calculated at Step S33 of FIG. 6. In detail, the NOx occlusion quantity is calculated based on the relationship between the reducing agent consumption quantity ΔAF1 and the NOx occlusion quantity Qnox as shown in FIG. 8, i.e., the map obtained through experiment and the like beforehand and stored in the ROM. Fundamentally, as shown in FIG. 8, there is the relationship (substantially proportional relationship in FIG. 8) that the NOx occlusion quantity Qnox increases as the reducing agent consumption quantity ΔAF1 increases.

Following Step S43 determines whether the NOx occlusion quantity Qnox (degradation degree of NOx catalyst) calculated (measured) at Step S42 is "equal to or less than" a predetermined threshold value K2. If it is determined that the NOx occlusion quantity Qnox is greater than the threshold value K2 (Qnox>K2), it is determined that the NOx catalyst 21 is not degraded (no degradation) and following Step S431 performs predetermined processing as processing as of the no degradation (for example, determination result is stored in EEPROM). If it is determined that the NOx occlusion quantity Qnox is equal to or less than the threshold value K2 (Qnox≦K2), it is determined that the NOx catalyst 21 is degraded (degradation exists, i.e., performance degradation due to other factor than NOX occlusion quantity occurs) and following Step S432 performs predetermined processing as processing as of the degradation (for example, sulfur poisoning recovery processing). In the case where the sulfur poisoning recovery processing is performed, the rich purge is performed over a long period (for example, 20 to 30 minutes) to maintain the state of the high temperature and the rich air fuel ratio. Thus, the SOx attached to the NOx catalyst 21 is discharged, and the purifying capacity of the NOx catalyst 21 is recovered. That is, the NOx catalyst 21 is recovered from the sulfur poisoning by performing the sulfur poisoning recovery processing. However, there are some cases where the NOx catalyst 21 is not fully recovered (purifying capacity is not recovered) even if the sulfur poisoning recovery processing is performed because of other factors such as heat degradation. In this case, predetermined failsafe processing according to the situation of each time is performed. For example, the situation is reported to the user to urge the user to do suitable treatment, for example, by turning on a warning lamp (MIL lamp).

Regardless of the existence or nonexistence of the degradation, the degradation determination execution flag F3 is set at 0 at Step S44 following Step S431 or S432. Thus, the execution condition of the processing of FIG. 7 is not satisfied, and the series of the processing of the degradation determination is ended.

Thus, the device according to the present embodiment performs the partial purge (partial recovery processing) for discharging only part of the exhaust component (NOx) occluded in the NOx catalyst 21 before the full purge (main recovery processing) for discharging the substantially entire portion of the occluded NOx (occluded component) as shown in FIGS. 2A, 2B and 4. Thus, also when degradation such as the sulfur poisoning (adsorption of sulfur oxides) mentioned above occurs in the NOx catalyst 21, the purifying rate equal to or greater than the demanded purifying rate can be surely maintained (as shown by point M2a in FIG. 3).

The above-described embodiment exerts following effects, for example.

(1) The device has the NOx catalyst 21 (occlusion purification part) that occludes the specific component (NOx) contained in the exhaust gas under an occlusion condition (lean air fuel ratio) and that purifies (reduces) and discharges the occluded exhaust component (occluded NOx) under a purification condition (rich air fuel ratio). The device performs the full purge (main recovery processing) for discharging the substantially entire portion of the occluded NOx at once based on establishment of the corresponding execution condition to recover the exhaust purification performance of the NOx catalyst 21. The exhaust purification device has the program (partial recovery device shown in FIG. 5) for performing the partial purge (partial recovery processing) for discharging only part of the exhaust component (occluded NOx) occluded by the NOx catalyst 21 before the execution of the full purge. Thus, even when the degradation such as the sulfur poisoning arises in the NOx catalyst 21, the purifying rate equal to or higher than the demanded purifying rate can be maintained more certainly.

(2) The preferable fuel consumption can be maintained by minimizing the purge quantity (reducing agent quantity) and by inhibiting excessive execution of the full purge.

(3) In a series of the processing of FIG. 5, the configuration is made such that the partial purge is consecutively repeated except for the period in which the full purge is performed. Thus, the parameters concerning the partial purge can be appropriately controlled (e.g., parameters are variably controlled or set to suitable fixed values) such that the increase in the occlusion quantity Qnox (FIG. 2A) and the eventual lowering of the purifying rate Rnox of the NOx catalyst 21 (FIG. 2B) are saturated. Thus, the purifying rate Rnox of the NOx catalyst 21 can be prevented from falling below the saturation value QSAT.

(4) The device has the program (execution period varying device, Step S24 of FIG. 5) that decides the execution period (time length of execution) of each partial purge based on the introduction quantity (introduction NOx quantity S) of the NOx introduced to the NOx catalyst 21. Thus, the decrease of the purifying rate of the NOx catalyst 21 can be saturated exactly.

(5) The device has the program (execution interval varying device, Step S12 of FIG. 4) that defines each execution interval of the partial purge based on the introduction quantity (introduction NOx quantity S) of the NOx introduced to the NOx catalyst 21. Thus, the execution timing of the partial purge is set at more suitable timing.

(6) As the method of calculating the introduction quantity (introduction NOx quantity S) of the NOx introduced to the NOx catalyst 21, the method of calculating the introduction quantity of the exhaust component by integrating the exhaust component introduction quantity per unit time based on the product of the concentration (introduction NOx concentration D) of the exhaust component and the exhaust gas flow rate (exhaust gas flow rate G) of each time is adopted (Step S11 of FIG. 4). Thus, the introduction quantity (introduction NOx quantity S) of the exhaust component can be calculated more precisely.

(7) The entirety of the requirements for the establishment of the execution condition of the full purge is that the execution time number of the partial purge becomes equal to or greater than the predetermined number (eight in the embodiment) since the first execution of the partial purge if the full purge has not been performed or since the last execution of the full purge if the full purge has been already performed (Step S13 of FIG. 4). Thus, the execution timing of the full purge is set at appropriate timing by simple control based on the execution time number of the partial purge.

(8) The NOx occlusion reduction catalyst 21 that performs the occlusion, the reduction and the purification of the NOx (nitrogen oxides) is used as the part (occlusion purification part) for performing the exhaust purification through the occlusion and the discharge. The discharge of the occluded exhaust component (occluded NOx) as the catalyst recovery processing is performed by the rich purge (full purge and partial purge). In the rich purge, the exhaust component (occluded NOx) occluded in the catalyst 21 is reduced and discharged by supplying the NOx reduction components (HC, CO and the like) to the catalyst 21. With such the scheme, the discharge quantity of the NOx posing the problem specifically in the diesel car and the like today can be reduced more exactly, and the purification of the exhaust gas can be realized.

(9) The exhaust purification device is applied to the vehicle, in which the diesel engine is mounted. Thus, the diesel car that has the higher exhaust purification performance and that discharges the cleaner exhaust gas is realized.

(10) The device has the program (degradation degree measurement device, Step S42 of FIG. 7) that measures the degradation degree of the catalyst 21 based on the consumption quantity of the NOx reduction component that is supplied to and consumed by the catalyst 21 when the full purge is performed. By measuring the degradation degree, processing (for example, processing of Step S431 or S432 in FIG. 7) corresponding to the degradation degree of the NOx catalyst 21 can be performed.

(11) As a method of calculating the consumption quantity (reducing agent consumption quantity) of the NOx reduction components (HC, CO and the like) in the NOx catalyst 21, the method of calculating the reducing agent consumption quantity based on the sensor outputs of the oxygen concentration sensors (A/F sensors 23, 24) provided upstream and downstream of the catalyst 21 respectively and the airflow meter provided in the intake system of the engine 10 as the object of the exhaust purification is used (Step S23 of FIG. 5 and Step S33 of FIG. 6). Thus, the reducing agent consumption quantity and the deterioration degree of the NOx catalyst 21 can be calculated with more precision.

(12) The device has the program (degradation determination device, Step S43 of FIG. 7) that determines the size of the degradation degree of the catalyst 21 calculated (measured) at Step S42 of FIG. 7 and the program (sulfur poisoning recovery device, Step S432 of FIG. 7) that performs processing (sulfur poisoning recovery processing) for recovering the exhaust purification performance of the catalyst 21 degraded by the sulfur poisoning when it is determined that the degradation degree of the catalyst 21 is large at Step S43 of FIG. 7, i.e., when it is determined that the NOx occlusion quantity Qnox is equal to or less than the predetermined threshold value K2. Thus, the high exhaust purification performance of the NOx catalyst 21 is maintained more certainly.

(13) The predetermined failsafe processing (for example, lighting of warning lamp) is performed when the catalyst 21 is not fully regenerated even if the sulfur poisoning recovery processing is performed at Step S432 of FIG. 7. Thus, the failsafe processing for coping with the recovery failure is performed automatically.

(14) The structure is simplified by executing the main recovery processing (full purge) and the partial recovery processing (partial purge) with the common device (injector 11).

The above-described embodiment may be modified as follows, for example.

A program (execution condition varying device) that varies the execution condition of the full purge (of which establishment is determined at Step S13 of FIG. 4) in accordance with the degradation degree of the catalyst 21 (calculated as NOx occlusion quantity) measured at Step S42 of FIG. 7 may be used. For example, the execution timing of the full purge may be advanced more as the degradation degree of the catalyst 21 increases. Thus, the catalyst degradation over an allowable level can be detected in an early stage.

In the embodiment, the condition based on the execution time number of the partial purge (established at predetermined execution time number or over since first execution of partial purge) makes up the requirements for the establishment of the execution condition of the full purge (of which establishment is determined at Step S13 of FIG. 4). Alternatively, other requirements may be used in addition to or in place for this requirement. For example, the device may have a program (occlusion quantity estimation device) that estimates the occlusion quantity (NOx occlusion quantity) of the NOx occluded in the NOx catalyst 21, and the condition that the estimated NOx occlusion quantity becomes equal to or greater than a predetermined quantity may be used as a part or entirety of the requirements for the establishment of the execution condition for the full purge. Moreover, in this case, the execution timing of the full purge can be set more exactly at suitable timing based on the occlusion quantity of the NOx (exhaust component).

In such a scheme, the NOx occlusion quantity can be estimated effectively by using a map, a formula or the like based on at least one of the concentration of the NOx (exhaust component) in the exhaust gas (introduction NOx concentration D), the exhaust flow rate (exhaust flow rate G), and the exhaust purification performance of the NOx catalyst 21 (equivalent to NOx occlusion quantity per unit time). With such parameters, the occlusion quantity can be estimated with sufficient accuracy. The exhaust purification performance of the NOx catalyst 21 can be estimated, for example, based on the temperature of the catalyst 21 (catalyst bed temperature), the degradation degree of the catalyst 21 (measured at Step S42 of FIG. 7) and the like.

In the embodiment, only the execution period (time length of execution) of each partial purge is defined based on the introduction NOx quantity S of each time (Step S24 of FIG. 5). Alternatively, the device may have a program (discharge quantity varying device) that decides the discharge quantity of the occlusion component per unit time of the partial purge based on the introduction NOx quantity S of each time. Specifically, in the case where the device according to the embodiment has such the program, a program that varies the rich degree (depth) of the partial purge, i.e., the air fuel ratio, in accordance with the introduction NOx quantity S of each time to set the discharge quantity of the occlusion component per unit time at a suitable value is effective. For example, such the program may be performed as the processing of Step S22 of FIG. 5. Such the scheme can exert an effect that is the same as or similar to the effect (4). Furthermore, the control accuracy can be improved more by combining such the scheme with the scheme for controlling the execution period.

A scheme of performing at least one of the partial purge and the full purge regularly (in constant time cycle) may be employed. Thus, the control is simplified and the controllability is improved.

A scheme of setting the execution interval of the partial purge (correlated with threshold value K1 used at Step S12 of FIG. 4, for example) and the discharge quantity of the occlusion component per unit time (correlated with air fuel ratio or the like) constant respectively at least during the repeated execution of the partial purge is also effective. With such a scheme, the control becomes easy and erroneous control or the like is inhibited. As a result, the controllability is improved. Also in this case, the decrease of the purifying rate of the NOx catalyst 21 tends to be saturated fundamentally (similarly to tendency of FIG. 2B).

A scheme using a device (for example, program) for varying at least one of each execution period (correlated with condition parameter concerning processing of Step S24 of FIG. 5, for example) of the partial purge (shown in FIG. 5) and the discharge quantity of the occlusion component per unit time discharged by the partial purge (correlated with air fuel ratio or the like, for example) in accordance with the degradation degree of the NOx catalyst 21 (measured at Step S42 of FIG. 7) is also effective.

The execution interval of the partial purge can be set at an arbitrary value. That is, the execution interval of the partial purge may be set as a fixed value or as a variable value.

In the above-described embodiment, in the processing of FIG. 7, the degradation degree of the NOx catalyst 21 is measured based on the quantity of the reducing agent (reducing agent consumption quantity) required in the reduction of the occlusion NOx in the full purge (at Step S42 of FIG. 7). Alternatively, the measurement may be performed based on the period (reduction necessary period) required in the reduction of the occlusion NOx through the full purge, for example. In detail, in this case, the timing at which the supply of the reduction component (rich component) to NOx catalyst 21 is actually started is sensed with the sensing signal of the upstream A/F sensor 23 when performing the full purge and the timing at which the reduction removal of the occlusion NOx is completed in the NOx catalyst 21 is detected with the sensing signal of the downstream A/F sensor 24. The degradation degree (lowering degree of purifying performance) of the NOx catalyst 21 is measured based on the reduction necessary period as the difference (time difference) between the timings. In this case, there is a concern about a response delay of the A/F sensors 23, 24. Therefore, in order to improve the accuracy of the measurement and the degradation determination, it is effective to change the rich degree (air fuel ratio) of the full purge in accordance with the degradation degree of the NOx catalyst 21. In this case, the degradation degree can be simply measured without using the sensing signals of the A/F sensor 23 upstream of the catalyst. That is, the period until the rich component is sensed by the A/F sensor 24 downstream of the catalyst can be calculated as the reduction necessary period on the basis of the start timing of the full purge (NOx reduction control). That is, in this case, the A/F sensor may be provided only downstream of the NOx catalyst 21.

In the processing of FIG. 7, a scheme of performing the measurement and the determination of the degradation degree of the NOx catalyst 21 (for example, setting degradation determination execution flag F3 at 1) under a condition (execution condition) that the temperature (specifically bed temperature) of the NOx catalyst 21 falls within a predetermined range (e.g., range from 300 to 450° C. where characteristic of catalyst 21 is stabilized) may be employed. Thus, the accuracy of the measurement and the determination can be improved. The temperature of the NOx catalyst 21 can be estimated, for example, based on the sensing signal of the exhaust temperature sensor 25 (equivalent to exhaust temperature).

The processing of FIG. 7 may be performed only under a condition that it is assumed that the purifying performance of the NOx catalyst 21 is deteriorated in connection with the sulfur poisoning or the catalyst degradation. For example, a condition that a travel distance of the vehicle reaches a predetermined distance (for example, 10000 km) or a total quantity of the fuel injection quantity injected by the injector 11 (integration value of respective fuel injection quantities) reaches a predetermined quantity may be used as the execution condition, and the measurement and the determination of the catalyst degradation may be performed only when the execution condition is satisfied (for example, degradation determination execution flag F3 may be set at 1). The measurement or the determination of the catalyst degradation are not indispensable factors. The present invention can be applied even without using the measurement or the determination as the requirements.

The exhaust purification device applied with the present invention is not limited to the device according to the embodiment but may be arbitrary. That is, the structure may be suitably changed in accordance with the use or the like. For example, the installation positions of the DPF 20 and the NOx catalyst 21 may be reversed. A purifying device integrating the DPF 20 and the NOx catalyst 21 may be provided in the exhaust pipe 18. An oxidation catalyst or the like may be additionally provided downstream of the NOx catalyst 21. In place for the A/F sensors 23, 24, an O2 sensor of an electromotive force output type that outputs a binary electromotive force signal varying in accordance with whether the exhaust gas is rich or lean may be used.

In the embodiment, it is assumed that the partial purge and the full purge are performed mainly in the air fuel ratio control based on the fuel injection quantity of the injector 11 (i.e., as rich purge). The mode of supplying the unburned fuel to the NOx catalyst 21 is arbitrary. For example, a posterior injection (for example, after injection or post-injection) as one of multi-stage injections may be performed after a main injection, and the reduction removal of the occlusion NOx may be performed with the unburned fuel supplied by the posterior injection. Alternatively, a fuel adding valve may be provided upstream of the NOx catalyst 21 of the exhaust system and the fuel (unburned fuel) may be supplied directly to the NOx catalyst 21 (not through engine 10). Moreover, these modes may be combined, and either one may be selected and executed in accordance with the operation range of the engine 10. For example, a scheme of performing the NOx reduction control with the fuel addition valve during a high load operation period or a high rotation operation period of the engine 10, in which a concern about discharge of smoke arises, and of performing the rich purge with the injector 11 in the other period is effective.

The main recovery processing (full purge) and partial recovery processing (partial purge) may be executed with different devices. For example, a scheme of performing the full purge with the fuel addition valve and of performing the partial purge with the injector 11 respectively may be used.

When performing the main recovery processing or the partial recovery processing, if the required quantity of the NOx (exhaust component) occluded in the NOx catalyst 21 (occlusion purification part) is discharged, it is enough. Any method can be employed in addition to the various types of fuel supply modes as long as the method satisfies such the condition.

Although the typical example of the NOx catalyst is illustrated as the embodiment, the kind of the NOx catalyst 21 is arbitrary. Although the demand as the NOx catalyst is presently main, the present invention can be applied likewise to other uses as long as the structure has an occlusion purification part (that performs occlusion and purification under certain conditions respectively) having characteristics similar to those of the NOx catalyst.

In the embodiment, the present invention is applied to the common rail system of the vehicle diesel engine as an example. Fundamentally, the present invention can be also applied to a spark ignition gasoline engine (specifically, direct injection engine) likewise.

In the embodiment, the partial purge is consecutively and repeatedly executed except for the period in which the full purge is performed in the series of the processing of FIG. 5. Alternatively, the partial purge may be performed repeatedly only during a predetermined interval before the execution of the full purge. For example, a scheme that does not perform the partial purge in a predetermined period immediately after the full purge execution can be suitably employed in accordance with the use or the like.

The repeated execution of the partial purge is not the indispensable scheme. As long as the exhaust purification device has the device for performing the partial recovery processing, which discharges only part of the exhaust component occluded in the occlusion purification part (for example, NOx catalyst 21) as the purification device, before the execution of the main recovery processing, an effect that is the same as or similar to the effect (1) can be exerted and the desired object can be attained.

In the embodiment and the modifications, it is assumed that various kinds of software (programs) are used to embody the exhaust purification device according to the present invention. Alternatively, the same function may be realized by hardware such as a dedicated circuit.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An exhaust purification device comprising:
   an occlusion purification part that occludes a specific component contained in exhaust gas under an occlusion condition and that purifies and discharges the occluded exhaust component under a purification condition;
   a full recovery device that, at each of plural separated intervals, performs main recovery processing for discharging substantially an entire portion of the exhaust component occluded in the occlusion purification part based on establishment of a first execution condition of the main recovery processing to recover exhaust purification performance of the occlusion purification part; and
   a partial recovery device that performs partial recovery processing for discharging only part of the exhaust component occluded in the occlusion purification part based on a different second execution condition at times other than execution of the main recovery processing;
   wherein at least one requirement for the establishment of the execution condition of the main recovery processing is that the partial recovery processing by the partial recovery device has been executed a number of times equal to or greater than a predetermined number since the first partial recovery processing if the main recovery processing has not yet been performed or since the last main recovery processing if the main recovery processing has been performed.

2. The exhaust purification device as in claim 1, further comprising:
   an occlusion quantity estimation device that estimates the occlusion quantity of the exhaust component occluded in the occlusion purification part, wherein:
   at least one requirement for the establishment of the execution condition of the main recovery processing is that the occlusion quantity of the exhaust component estimated by the occlusion quantity estimation device becomes equal to or greater than a predetermined quantity.

3. The exhaust purification device as in claim 2, wherein the occlusion quantity estimation device estimates the occlusion quantity based on at least one of a concentration of the exhaust component in the exhaust gas, an exhaust gas flow rate and the exhaust purification performance of the occlusion purification part.

4. The exhaust purification device as in claim 1, wherein the occlusion purification part includes a nitrogen oxides occlusion reduction catalyst that occludes, reduces and purifies nitrogen oxides as the specific component, and the partial recovery device supplies a nitrogen oxides reducing component to the catalyst to reduce and discharge the exhaust component occluded by the catalyst.

5. The exhaust purification device as in claim 4, further comprising:
   a degradation degree measurement device that measures a degradation degree of the catalyst based on a consumption quantity of the nitrogen oxides reducing component, which is supplied to the catalyst during the main recovery processing, at the catalyst.

6. The exhaust purification device as in claim 5, further comprising:
   a degradation determination device that determines a size of the degradation degree of the catalyst measured by the degradation degree measurement device; and
   a sulfur poisoning recovery device that performs processing for recovering the exhaust purification performance of the catalyst degraded by sulfur poisoning when the degradation determination device determines that the degradation degree of the catalyst is large.

7. The exhaust purification device as in claim 5, further comprising:
an execution condition varying device that varies the execution condition of the main recovery processing in accordance with the degradation degree of the catalyst measured by the degradation degree measurement device.

8. The exhaust purification device as in claim 1, wherein:
the partial recovery device repeatedly performs the partial recovery processing at consecutive execution intervals except (a) for a period which encompasses performance of the main recovery processing or (b) during a predetermined interval before or after execution of the main recovery processing.

9. The exhaust purification device as in claim 8, further comprising:
an execution period varying device that determines an execution period for each partial recovery processing based on an introduction quantity of the exhaust component introduced to the occlusion purification part.

10. The exhaust purification device as in claim 8, further comprising:
a discharge quantity varying device that determines a discharge quantity of the occluded component discharged per unit time through the partial recovery processing for each time based on the introduction quantity of the exhaust component introduced to the occlusion purification part.

11. The exhaust purification device as in claim 8, further comprising:
an execution interval varying device that determines each execution interval of the partial recovery processing for each time based on the introduction quantity of the exhaust component introduced to the occlusion purification part.

12. The exhaust purification device as in claim 8, wherein:
the execution interval of the partial recovery processing and the discharge quantity of the occluded component per unit time discharged through the partial recovery processing are set to have constant values at least during repeated execution of the partial recovery processing.

13. The exhaust purification device, wherein an occlusion purification part that occludes a specific component contained in exhaust gas under an occlusion condition and that purifies and discharges the occluded exhaust component under a purification condition;
a full recovery device that, at each of plural separated intervals, performs main recovery processing for discharging substantially an entire portion of the exhaust component occluded in the occlusion purification part based on establishment of a first execution condition of the main recovery processing to recover exhaust purification performance of the occlusion purification part;
a partial recovery device that performs partial recovery processing for discharging only part of the exhaust component occluded in the occlusion purification part based on a different second execution condition at times other than execution of the main recovery processing; and
the partial recovery device repeatedly performs the partial recovery processing by repeatedly stopping discharge of the exhaust component from the occlusion purification part during the discharge, regardless of a quantity of the specific component occluded in the occlusion purification part, to saturate increase saturation in the specific component occluded in the occlusion purification part and to restrict a purifying rate of the occlusion purification part from falling below a saturation value of the occlusion purification part.

14. The exhaust purification device as in claim 13, wherein:
the full recovery device oversupplies fuel to the occlusion purification part to perform the main recovery processing, and
the partial recovery device oversupplies fuel to the occlusion purification part to perform the partial recovery processing.

15. The exhaust purification device as in claim 14, wherein:
the partial recovery device repeatedly performs the partial recovery processing a plurality of times between executions of the main recovery processing.

16. The exhaust purification device as in claim 15, wherein:
the full recovery device performs the main recovery processing by establishing a rich state compared with the partial recovery processing.

17. An exhaust purification device comprising:
an occlusion purification part that occludes a component contained in exhaust gas under an occlusion condition and that purifies and discharges the occluded exhaust component under a purification condition;
a full recovery device that oversupplies fuel to the occlusion purification part for performing main recovery processing to discharge substantially an entire portion of the exhaust component occluded in the occlusion purification part to recover exhaust purification performance of the occlusion purification part; and
a partial recovery device that oversupplies fuel to the occlusion purification part for consecutively performing partial recovery processing to discharge only part of the exhaust component occluded in the occlusion purification part at times other than execution of the main recovery processing, wherein
the partial recovery device repeatedly performs the partial recovery processing, regardless of a quantity of the specific component occluded in the occlusion purification part, before a purifying rate of the occlusion purification part falls below a saturation value of the occlusion purification part.

18. The exhaust purification device as in claim 17, wherein:
the full recovery device performs the main recovery processing by establishing a rich state compared with the partial recovery processing.

* * * * *